April 28, 1931.  J. BETHUNE  1,803,295
POWER TRANSMISSION GEARING
Filed Sept. 9, 1929

INVENTOR
John Bethune
BY
Whittemore Hulbert Whittemore Belknap
ATTORNEYS

Patented Apr. 28, 1931

1,803,295

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

POWER TRANSMISSION GEARING

Application filed September 9, 1929. Serial No. 391,489.

The invention relates to power transmission gearing and more particularly to that type in which the power is transmitted through a plurality of loaded gear trains having noise reducing differential characteristics. The present invention relates to a particular construction of gearing of this type, viz: one in which the gears of the respective trains differ both in normal pitch and in the helical angles of the teeth. The invention therefore consists in the construction as hereinafter set forth.

It is well known in the gear art that where gears are run at a relatively high peripheral speed there is developed a sound or tone which rises in pitch as the speed is increased. It is also a fact that gears of different characteristics such as differences in circular pitch or in angle of teeth have individual tone producing qualities. I have discovered that where the power is transmitted through a plurality of gear trains having differential characteristics the sound produced is lessened, probably through interference between vibrations of different frequencies having a neutralizing effect on each other. Whether or not this is the true theory, it is a demonstrated fact that with such constructions noise production is lessened.

Figure 1:
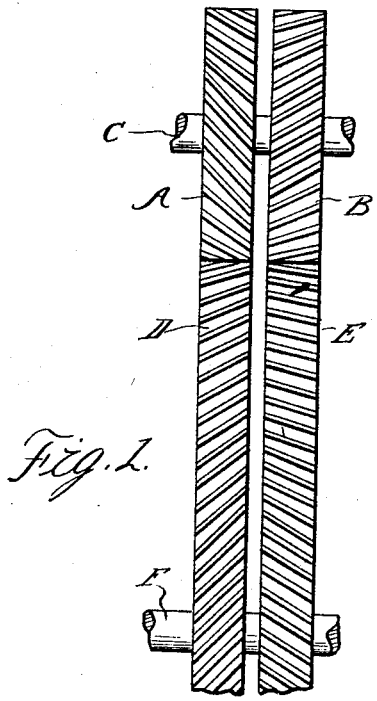
Figure 1 is a side elevation of a power transmission gearing embodying my invention.
Figure 2:
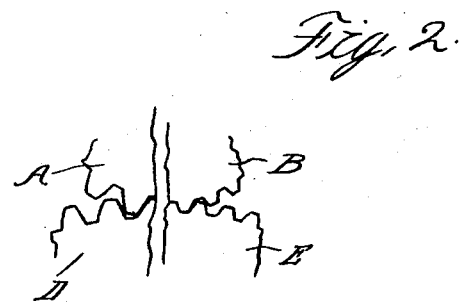
Figure 2 is an end elevation.

With the particular construction forming the subject matter of the present application, the differential characteristics of the two gear trains are first, a difference in circular pitch and second, a difference in helical angle. Thus as shown in Figures 1 and 2, A and B are two gears mounted on a common shaft C and D and E are the mating gears mounted on the common shaft F. The two trains A, D and B, E, are of equal ratio but of different circular pitch. For instance, the gear A may have twelve teeth and the gear D thirty-six teeth, both six pitch, while the gear B may have twenty-four teeth and the gear E seventy-two teeth, both of twelve pitch. In addition to this difference between the gears of the two trains, there is also the difference in helical angle. Thus as shown, the helical angle of the gears A and D is substantially forty-five degrees while that of the gears B and E is thirty degrees.

In operation, the load on the shaft F is divided between the two gear trains and because of the differential characteristics of these trains in pitch and helical angle, the sound production is greatly reduced.

While I have described my gearing as formed of a plurality of trains of different gears, it is obvious that the gears on the same shaft may, if desired, be formed on a single blank.

Figure 3:
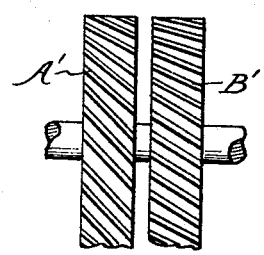
Figure 3 is a view similar to Figure 1 showing a modified construction.

In the modified construction shown in Figure 3 instead of having the helical angle of the two gears on the same shaft sloped in opposite directions, the slope may be in the same direction, the angles being different. Such a construction is shown in Figure 3 in which A' shows a gear having a helical angle of forty-five degrees and B' a gear having a helical angle of thirty degrees, both being sloped in the same direction.

What I claim as my invention:

1. A power transmission gearing comprising a plurality of simultaneously loaded equal ratio helical gear trains, the teeth of the two trains being different in circular pitch and in helical angle.

2. A power transmission gearing comprising a plurality of simultaneously loaded equal ratio helical gear trains, the teeth of the two trains being of different circular pitch and also of different helical angles oppositely inclined.

3. The combination with a rotary drive member and a rotary driven member, of a gear train therebetween having a plurality of equal ratio simultaneously loaded gear train portions between said members, the teeth in the respective gear train portions having differential helical angles and differential pitch.

4. A herringbone gear having the oppositely inclined teeth of different helical angle and of different pitch.

In testimony whereof I affix my signature.

JOHN BETHUNE.